United States Patent
Martin (10) Patent No.: US 10,665,208 B2
(45) Date of Patent: May 26, 2020

(54) GRAPHICS PROCESSING SYSTEMS AND GRAPHICS PROCESSORS

(71) Applicant: ARM Ltd, Cambridge (GB)

(72) Inventor: Samuel Martin, Waterbeach (GB)

(73) Assignee: ARM Limited, Cambridge (GB)

( * ) Notice: Subject to any disclaimer, the term of this patent is extended or adjusted under 35 U.S.C. 154(b) by 88 days.

(21) Appl. No.: 15/693,913

(22) Filed: Sep. 1, 2017

(65) Prior Publication Data

US 2018/0068640 A1    Mar. 8, 2018

(30) Foreign Application Priority Data

Sep. 5, 2016 (GB) .................................. 1615012.0

(51) Int. Cl.
*G09G 5/391* (2006.01)
*G06F 3/01* (2006.01)
(Continued)

(52) U.S. Cl.
CPC ............ *G09G 5/391* (2013.01); *G06F 3/011* (2013.01); *G06F 3/013* (2013.01); *G06K 9/0061* (2013.01); *G06T 1/20* (2013.01); *G06T 3/4038* (2013.01); *G06T 11/40* (2013.01); *G06T 15/205* (2013.01); *G09G 5/026* (2013.01); *G09G 5/363* (2013.01); *G06T 15/405* (2013.01); *G06T 2210/36* (2013.01); *G09G 2340/0407* (2013.01); *G09G 2340/14* (2013.01); *G09G 2354/00* (2013.01); *G09G 2360/122* (2013.01); *G09G 2360/18* (2013.01)

(58) Field of Classification Search
None
See application file for complete search history.

(56) References Cited

U.S. PATENT DOCUMENTS 9,240,069 B1    1/2016  Li
2004/0233219 A1*  11/2004  Aguera y Arcas ... G06F 3/0481
345/606
(Continued)

FOREIGN PATENT DOCUMENTS

WO    2015128634 A1    9/2015

OTHER PUBLICATIONS

Search Report dated Feb. 28, 2017 on related application No. GB1615012.0, filed Sep. 5, 2016.

*Primary Examiner* — Sarah Le
(74) *Attorney, Agent, or Firm* — EIP US LLP (57) ABSTRACT

A graphics processing system includes a graphics processing pipeline including at least an initial processing stage and a further processing stage. Data for a scene at a first resolution and data for the scene at a second resolution are processed in the initial processing stage. After processing data for the scene at the first and second resolutions in the initial processing stage, gaze-tracking data relating to a current positioning of at least one eye of a user of a virtual reality user device is received. At least one sub-region of the scene is identified from the gaze-tracking data. Data for the scene at the first resolution and only data corresponding to the identified at least one sub-region of the scene at the second resolution are processed in the further processing stage. The scene is rendered by combining the data for the scene processed in the further processing stage.

20 Claims, 8 Drawing Sheets

100

(51) Int. Cl.
    *G09G 5/02*     (2006.01)
    *G06K 9/00*     (2006.01)
    *G06T 11/40*     (2006.01)
    *G06T 1/20*     (2006.01)
    *G06T 3/40*     (2006.01)
    *G06T 15/20*     (2011.01)
    *G09G 5/36*     (2006.01)
    *G06T 15/40*     (2011.01)

(56) References Cited

U.S. PATENT DOCUMENTS

| | | |
|---|---|---|
| 2014/0247277 A1 | 9/2014 | Guenter et al. |
| 2015/0287167 A1 | 8/2015 | Cerny |
| 2017/0004648 A1* | 1/2017 | Li .................. G02B 27/017 |
| 2017/0200308 A1* | 7/2017 | Nguyen ............ G06T 3/0012 |

* cited by examiner

GRAPHICS PROCESSING SYSTEMS AND GRAPHICS PROCESSORS

CROSS-REFERENCE TO RELATED APPLICATIONS

This application claims the benefit under 35 U.S.C. § 119(a) and 37 CFR § 1.55 to United Kingdom patent application no. 1615012.0, filed on Sep. 5, 2016, the entire content of which is incorporated herein by reference.

BACKGROUND

Field of the Disclosure

The present disclosure relates to graphics processing systems and graphics processors.

Description of the Related Technology

Foveated rendering is a rendering technique where one part of an image being displayed is rendered at a higher resolution and one or more other parts of the image are rendered at a lower resolution. This is because the part of the image which the user is looking directly at may need to be rendered at a higher resolution for visual acceptability, while peripheral regions of the image which the user is not directly looking at can be rendered at a lower resolution whilst still appearing visually acceptable. Foveated rendering can be used to reduce the rendering burden on a graphics processing unit (GPU), by rendering peripheral regions of the image at a lower resolution, rather than rendering the entire image at the highest resolution.

Foveated rendering may involve identifying one or more fixation points where the higher resolution versions of the image will be rendered, with the regions further away from the fixation point or points being rendered with a lower resolution. There are different ways in which the location of the highest resolution region of the image, namely the fixation point or points, may be determined. For example, a head-tracking or eye-tracking system may be used to try to identify where the user is looking in the image.

One use for foveated rendering is when rendering images for virtual reality (VR) displays, for example virtual reality head-mounted displays (VR HMDs). High resolution VR HMDs may use lenses that feature severe barrel distortion. The effect of this is that the rendered image towards the center of the display for each eye is magnified, whereas the peripheral areas are all minified. The peripheral regions can therefore be rendered at a lower quality than the central, magnified region, without any significant loss in the overall visual effect for the user.

There remains scope, however, for improvements to the operation of graphics processors and graphics processing systems, for example when performing foveated rendering.

SUMMARY

In a first embodiment, there is provided a method of operating a graphics processing system. The system includes a graphics processing pipeline, which includes at least an initial processing stage and a further processing stage. The method includes processing, in the initial processing stage, data for a scene at a first resolution. The method includes processing, in the initial processing stage, data for the scene at a second resolution. The method includes, after processing data for the scene at the first and second resolutions in the initial processing stage, receiving gaze-tracking data relating to a current positioning of at least one eye of a user of a virtual reality user device. The method includes identifying, from the received gaze-tracking data, at least one sub-region of the scene. The method includes processing, in the further processing stage, data for the scene at the first resolution. The method includes processing, in the further processing stage, only data corresponding to the identified at least one sub-region of the scene at the second resolution. The method includes rendering the scene by combining the data for the scene processed in the further processing stage at the first resolution, and the data corresponding to the identified at least one sub-region of the scene processed in the further processing stage at the second resolution.

In a second embodiment, there is provided a non-transitory computer-readable storage medium including computer-executable instructions which, when executed by a processor, cause operation of a graphics processing system including a graphics processing pipeline, which includes at least an initial processing stage and a further processing stage. The computer-executable instructions, when executed by the processor, cause operation of the graphics processing system by processing, in the initial processing stage, data for a scene at a first resolution. The computer-executable instructions, when executed by the processor, cause operation of the graphics processing system by processing, in the initial processing stage, data for the scene at a second resolution. The computer-executable instructions, when executed by the processor, cause operation of the graphics processing system by, after processing data for the scene at the first and second resolutions in the initial processing stage, receiving gaze-tracking data relating to a current positioning of at least one eye of a user of a virtual reality user device. The computer-executable instructions, when executed by the processor, cause operation of the graphics processing system by identifying, from the received gaze-tracking data, at least one sub-region of the scene. The computer-executable instructions, when executed by the processor, cause operation of the graphics processing system by processing, in the further processing stage, data for the scene at the first resolution. The computer-executable instructions, when executed by the processor, cause operation of the graphics processing system by processing, in the further processing stage, only data corresponding to the identified at least one sub-region of the scene at the second resolution. The computer-executable instructions, when executed by the processor, cause operation of the graphics processing system by rendering the scene by combining the data for the scene processed in the further processing stage at the first resolution, and the data corresponding to the identified at least one sub-region of the scene processed in the further processing stage at the second resolution.

In a third embodiment, there is provided a graphics processing system including a graphics processing pipeline. The graphics processing pipeline includes at least an initial processing stage and a further processing stage. The graphics processing system is configured to process, in the initial processing stage, data for a scene at a first resolution. The graphics processing system is configured to process, in the initial processing stage, data for the scene at a second resolution. The graphics processing system is configured to, after processing data for the scene at the first and second resolutions in the initial processing stage, receive gaze-tracking data relating to a current positioning of at least one eye of a user of a virtual reality user device. The graphics processing system is configured to identify, from the received gaze-tracking data, at least one sub-region of the scene. The graphics processing system is configured to process, in the further processing stage, data for the scene at the first resolution. The graphics processing system is configured to process, in the further processing stage, only data corresponding to the identified at least one sub-region of the scene at the second resolution. The graphics processing system is configured to render the scene by combining the data for the scene processed in the further processing stage at the first resolution, and the data corresponding to the identified at least one sub-region of the scene processed in the further processing stage at the second resolution.

Further features and advantages will become apparent from the following description, given by way of example only, which is made with reference to the accompanying drawings.

DETAILED DESCRIPTION OF CERTAIN INVENTIVE EMBODIMENTS

A number of examples in accordance with embodiments of the present disclosure will now be described in the context of the processing of computer graphics for display.

Figure 1:
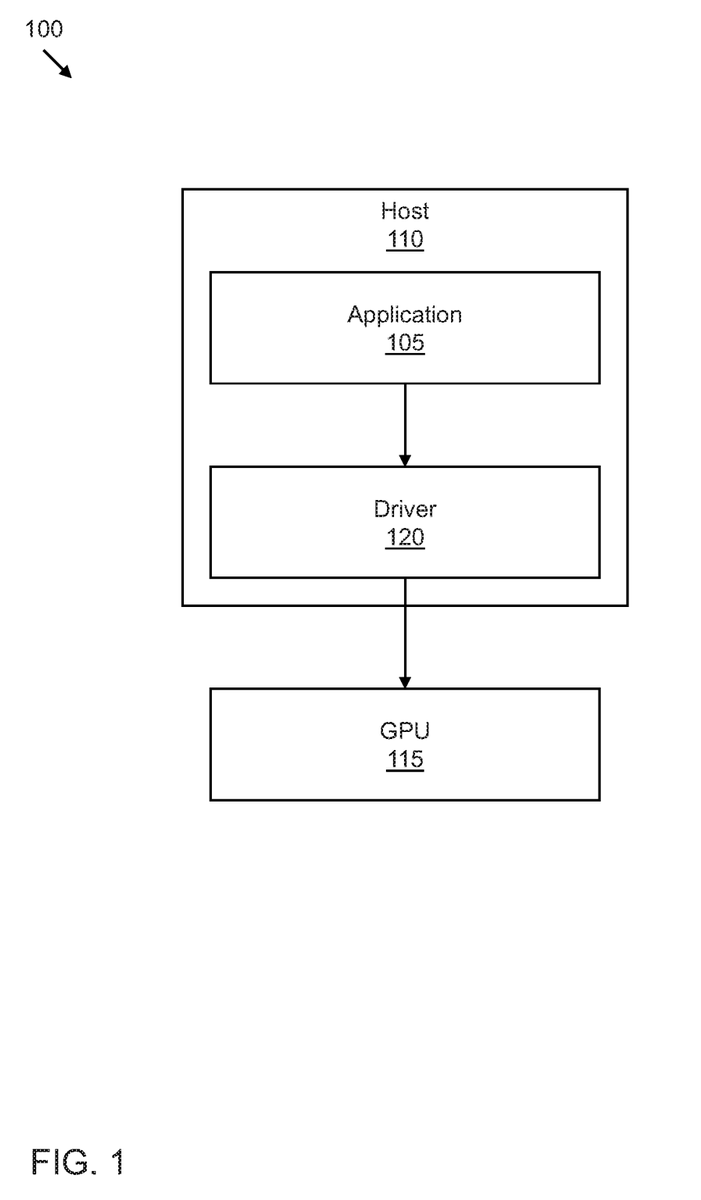
FIG. 1 shows schematically an example of a graphics processing system in accordance with an embodiment of the present disclosure.

Referring to FIG. 1, there is shown schematically an example of a graphics processing system 100.

In this example, an application 105, such as a game, executing on a host processor 110 requests graphics processing operations to be performed by an associated GPU 115. To do this, the application 105 generates Application Programming Interface (API) calls that are interpreted by a driver 120 for the GPU 115. The driver 120 runs on the host processor 110. The driver 120 generates appropriate commands to the GPU 115 to generate the graphics output requested by the application 105. A set of commands is provided to the GPU 115 in response to the commands from the application 105. The commands may be to generate a frame to be displayed on a display.

Figure 2:
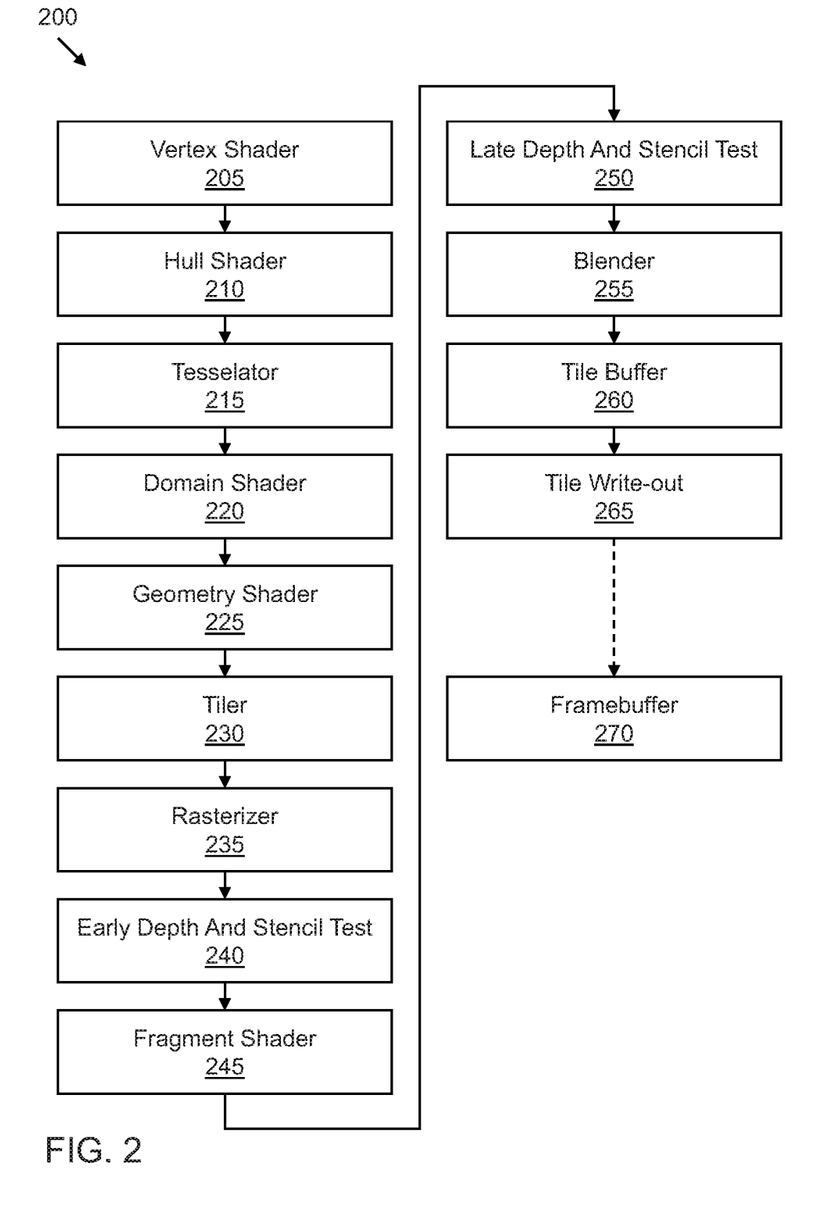
FIG. 2 shows schematically an example of a graphics processing pipeline in accordance with an embodiment of the present disclosure.

Referring to FIG. 2, there is shown schematically an example of a graphics processing pipeline 200. The graphics processing pipeline 200 indicates a sequence of actions that may be performed by a GPU.

In this example, the GPU is a tile-based renderer. The GPU therefore produces tiles of a render output data array to be generated. The render output data array may be an output frame. Tile-based rendering differs from immediate mode rendering in that, rather than the entire render output being processed in one go, the render output is divided into a plurality of smaller sub-regions (or 'areas'). Those sub-regions are referred to herein as tiles. Each tile is rendered separately. For example, each tile may be rendered one after another. The rendered tiles are then recombined to provide the complete render output for display. In tile-based rendering, the render output may be divided into regularly sized and shaped tiles. The tiles may be square or another shape.

Other terms that may be used for "tiling" and "tile-based" rendering include "chunking", where the rendering tiles are referred to as "chunks", and "bucket" rendering. The terms "tile" and "tiling" will be used hereinafter for convenience, but it should be understood that these terms are intended to encompass all alternative and equivalent terms and techniques.

The render output data array may be an output frame intended for display on a display device, such as a screen or printer. The render output may also, for example, comprise intermediate data intended for use in later rendering passes. An example of this is a "render to texture" output.

When a computer graphics image is to be displayed, it may first be defined as a set of geometries, for example as a series of primitives. An example of a primitive is a polygon. The geometries are then divided into graphics fragments in a rasterization process. This is followed by graphics rendering. During a graphics rendering operation, the renderer may modify data associated with each fragment so that the fragments can be displayed correctly. Examples of such data include the color and transparency. Once the fragments have fully traversed the renderer, then their associated data values are stored in memory, ready for output.

FIG. 2 shows various elements and pipeline stages associated with a GPU that are relevant to the operation of the embodiments described herein. There may however be other elements and stages of the graphics processing pipeline that are not illustrated in FIG. 2. It should also be noted that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline 200 may be implemented as desired and will accordingly comprise, for example, appropriate circuitry and/or processing logic, etc., for performing the associated operation and functions.

As shown in FIG. 2, the graphics processing pipeline 220 that the GPU executes includes a number of stages, including vertex shader 205, a hull shader 210, a tesselator 215, a domain shader 220, a geometry shader 225, a tiler 230, a rasterization stage 235, an early Z (or 'depth') and stencil test stage 240, a renderer in the form of a fragment shading stage 245, a late Z (or 'depth') and stencil test stage 250, a blending stage 255, a tile buffer 260 and a downsampling and writeout stage 265. Other arrangements for a GPU are however possible.

The vertex shader 205 receives input data values associated with the vertices defined for the output to be generated. The vertex shader 205 processes those data values to generate a set of corresponding, vertex-shaded, output data values for use by subsequent stages of the graphics processing pipeline 200.

Each primitive to be processed may be defined and represented by a set of vertices. Each vertex for a primitive may have associated with it a set of attributes. A set of attributes is a set of data values for the vertex. These attributes may include position data and other, non-position data (or 'varyings'). The non-position data may define, for example, color, light, normal and/or texture coordinates for the vertex in question.

A set of vertices is defined for given output to be generated by the GPU. The primitives to be processed for the output comprise given vertices in the set of vertices. The vertex shading operation transforms the attributes for each vertex into a desired form for subsequent graphics processing operations. This may comprise, for example, transforming vertex position attributes from the world or user space for which they are initially defined to the screen space in which the output of the graphics processing system is to be displayed. This may also comprise, for example, modifying the input data to take account of the effect of lighting in the image to be rendered.

The hull shader 210 performs operations on sets of patch control points and generates additional data known as patch constants.

The tessellation stage 215 subdivides geometry to create higher-order representations of the hull.

The domain shader 220 performs operations on vertices output by the tessellation stage, in a similar manner to the vertex shader 205.

The geometry shader 225 processes entire primitives such as a triangles, points or lines.

The vertex shader 205, hull shader 210, tesselator 215, domain shader 220 and geometry shader 225 perform the fragment frontend operations, such as transformation and lighting operations, and primitive setup, to setup the primitives to be rendered, in response to commands and vertex data provided to the GPU.

Once all the primitives to be rendered have been appropriately set up, the tiler 230 then determines which primitives are to be processed for each tile that the render output has been divided into for processing purposes. To do this, the tiler 230 compares the location of each primitive to be processed with the tile positions, and adds the primitive to a respective primitive list for each tile that it determines the primitive could potentially fall within. Any suitable and desired technique for sorting and binning primitives into tile lists, such as exact binning, or bounding box binning or anything in between, can be used for the tiling process.

Once lists of primitives to be rendered (or 'primitive lists') have been prepared for each rendering tile in this way, the primitive lists are stored for use. The primitive lists allow the system to identify which primitives are to be considered and rendered when the tile in question is rendered.

Once the tiler 230 has prepared all of the tile lists, then each tile can be rendered. To do this, each tile is processed by the graphics processing pipeline stages that follow the tiler 230.

When a given tile is being processed, each primitive that is to be processed for that tile is passed to the rasterizer 235. The rasterization stage 235 of the graphics processing pipeline 200 operates to rasterize the primitives into individual graphics fragments for processing. To do this, the rasterizer 235 rasterizes the primitives to sampling points and generates graphics fragments having appropriate positions for rendering the primitives. The fragments generated by the rasterizer 235 are then sent onwards to the rest of the pipeline 200 for processing.

The early Z and stencil test stage 240 performs a Z (or 'depth') test on fragments it receives from the rasterizer 235 to see if any fragments can be discarded (or 'culled') at this stage. To do this, the early Z and stencil test stage 240 compares the depth values of fragments issued by the rasterizer 235 with the depth values of fragments that have already been rendered. The depth values of fragments that have already been rendered are stored in a depth buffer that is part of the tile buffer 260. The comparison performed by the early Z and stencil test stage 240 is to determine whether or not the new fragments will be occluded by fragments that have already been rendered. At the same time, an early stencil test is carried out. Fragments that pass the fragment early Z and stencil test stage 240 are sent to the fragment shading stage 245. The fragment shading stage 245 performs the appropriate fragment processing operations on the fragments that pass the early Z and stencil tests to generate the appropriate rendered fragment data. This fragment processing may include any suitable fragment shading processes, such as executing fragment shader programs on the fragments to generate the appropriate fragment data, applying textures to the fragments, applying fogging or other operations to the fragments, etc. The fragment shading stage 245 may be a programmable fragment shader.

There is then a late fragment Z and stencil test stage 250, which carries out, amongst other things, an end of pipeline depth test on the shaded fragments to determine whether a rendered fragment will actually be seen in the final image. This depth test uses the Z-buffer value for the position of the fragment that is stored in the Z-buffer in the tile buffer 260 to determine whether the fragment data for the new fragments should replace the fragment data of the fragments that have already been rendered. This may involve comparing the depth values of the fragments issued by the fragment shading stage 245 with the depth values of fragments that have already been rendered, as stored in the Z buffer. This late fragment depth and stencil test stage 250 may also carry out late alpha and/or stencil tests on the fragments.

The fragments that pass the late fragment test stage 250 may then be subjected, in the blender 255, to any blending operations with fragments that are already stored in the tile buffer 260. Any other remaining operations necessary on the fragments, such as dither, etc. (not shown) are also carried out at this stage.

Finally, the output fragment data (or 'values') are written to the tile buffer 260. The output fragment data can then be output to a framebuffer 270 for display. The depth value for an output fragment is also written appropriately to a Z-buffer within the tile buffer 260. The tile buffer 260 stores color and depth buffers that store an appropriate color, etc., or Z-value, respectively, for each sampling point that the buffers represent. These buffers store an array of fragment data that represents part, in this example a tile, of the overall render output with respective sets of sample values in the buffers corresponding to respective pixels of the overall render output. For example, each 2×2 set of sample values may correspond to an output pixel, where 4× multisampling is used.

The tile buffer 260 is provided as part of random access memory (RAM) that is local to the graphics processing pipeline 200. In other words, the tile buffer 260 is provided in on-chip memory.

The data from the tile buffer 260 is input to a downsampling write out-unit 265, and then output (or 'written back') to an external memory output buffer, such as a framebuffer 270 of a display device (not shown). The display device could comprise, for example, a display comprising an array of pixels, such as a computer monitor or a printer.

The downsampling and writeout unit 265 downsamples the fragment data stored in the tile buffer 260 to the appropriate resolution for the output buffer and device, such that an array of pixel data corresponding to the pixels of the output device is generated. This results in output values in the form of pixels for output to the output buffer 270.

Once a tile of the render output has been processed and its data exported to a main memory for storage, for example to the frame buffer 270 in a main memory, the next tile is then processed, and so on, until sufficient tiles have been processed to generate the entire render output. The process is then repeated for the next render output and so on.

As can be seen from FIG. 2, the graphics processing pipeline 200 includes a number of programmable processing or "shader" stages, namely the vertex shader 205, the hull shader 210, the domain shader 220, the geometry shader 225, and the fragment shader 245. These programmable shader stages execute respective shader programs that have one or more input variables and generate sets of output variables. The shader program in question may be executed for each work item to be processed, for example for each vertex in the case of the vertex shader 205. An execution thread may be issued for each work item to be processed, and the thread then executes the instructions in the shader program to produce the desired, shaded, output data.

An application, such as application 105 described above with reference to FIG. 1, provides the shader programs to be executed using a high-level shader programming language, such as OpenGL® Shading Language (GLSL), High-level Shading Language (HLSL), Open Computing Language (OpenCL), etc. These shader programs are then translated by a shader language compiler to binary code for the target graphics processing pipeline 200. This may include creating one or more internal, intermediate representations of the program within the compiler. The compiler may, for example, be part of the driver 120, with there being a special API call to cause the compiler to run. The compiler execution can thus be seen as being part of the draw call preparation done by the driver in response to API calls generated by the application 105.

Returning now to foveated rendering, gaze-tracking, also known as eye-tracking, has significant potential to impact several areas of VR, including foveated rendering.

The human eye has most of its receptors in the fovea, which is the area of the eye responsible for sharp central vision. The fovea is small compared to the full field of vision. For near-eye displays, such as those used in VR systems, the eye can only perceive a subset of the information on the display at any instant. Gaze-tracked foveated rendering adapts rendering to keep full computation in the display area the fovea can see, and reduces computation elsewhere.

Figure 3:
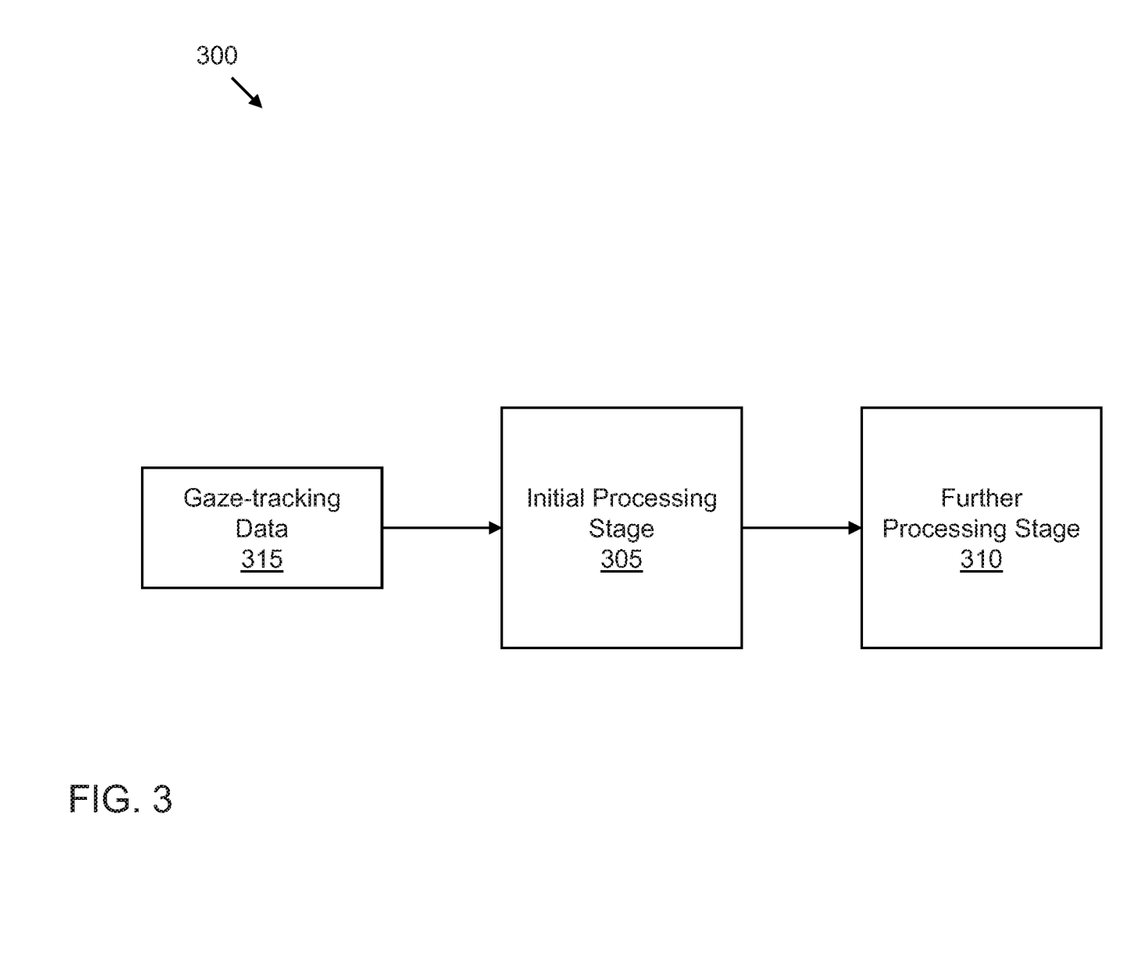
FIG. 3 shows schematically another example of a graphics processing pipeline in accordance with an embodiment of the present disclosure.

Referring to FIG. 3, there is shown schematically an example of a graphics processing pipeline 300. The graphics processing pipeline 300 is comprised in a graphics processing system. The graphics processing pipeline 300 comprises, at least, an initial processing stage 305 and a further processing stage 310. The graphics processing pipeline 300 may be used to perform gaze-tracked foveated rendering.

Gaze-tracking data 315 is received prior to any data processing in the initial processing stage 305 or the further processing stage 310. The gaze-tracking data 315 relates to a positioning of at least one eye of a user of a virtual reality user device. At least one sub-region of the scene is identified from the received gaze-tracking data. The identified least one sub-region of the scene may for example correspond to the area or areas of the scene the user is looking at. Data for the scene at a first resolution is processed in the initial processing stage 305 and/or the further processing stage 310. However, only data corresponding to the identified at least one sub-region of the scene at the second resolution is processed in the initial processing stage 305 and/or the further processing stage 310. The first resolution may be relatively high compared to the second resolution. The scene may then be rendered by combining the data output by the further processing stage 310. Gaze-tracked foveated rendering may therefore be provided where the first resolution is lower than the second resolution, since the gaze-tracking data 315 is used to influence the processing in the graphics pipeline 300.

While such an example provides for gaze-tracked foveated rendering, the success of gaze-tracked foveated rendering depends upon various factors. One such factor is the quality of the eye-tracking data 315. Another such factor is the response latency with which eye-tracking information obtained by an eye-tracker device is passed to and used by the rendering system. The less accurate the eye-tracking data is, as a result of latency making results less current and/or from lower-quality tracking data, the less successful the result of the foveated rendering.

Figure 4:
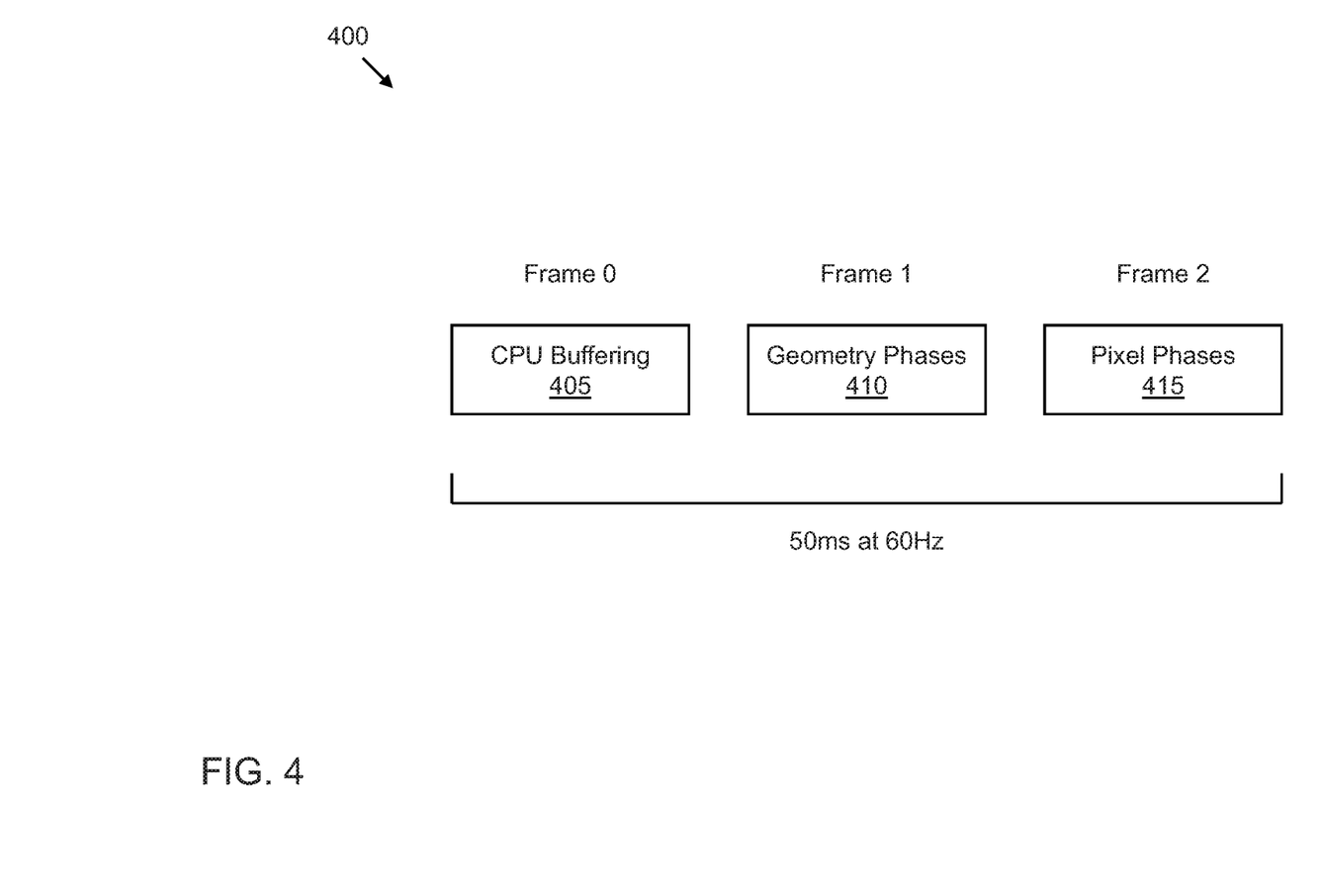
FIG. 4 shows schematically an example of frame pipelining in accordance with an embodiment of the present disclosure.

In terms of latency, in some examples, a GPU has a two-frame or three-frame pipeline depending, for example, on whether geometry is submitted in an initial frame or whether geometry is deferred until to the start of the next frame. A GPU may normally operate in the deferred mode, in which case the pipeline will be three frames. Referring to FIG. 4, there is shown schematically an example of frame pipelining 400. In this example, the GPU has a three-frame pipeline in which central processing unit (CPU) buffering 405 is performed in frame 0, geometry phases 410 are performed in frame 1, and pixel phases 415 are performed in frame 2. At a 60 Hz display rate, this gives a 50 ms latency between the time at which new data is provided to the graphics pipeline via a graphics API and the result being ready to output, for example to a display. The true latency could be significantly larger than this as it includes image sensor capture, processing and transport.

Given a target perceptual threshold of 20 ms motion-to-photons latency for VR systems, latency of over 50 ms is likely to be too high as far as user experience is concerned.

Returning again to foveated rendering, rendering content in the context of VR involves drawing the scene to multiple views, with at least one view for each eye. The OVR_multiview family of extensions (hereinafter 'multiview') may be used in OpenGL® for Embedded Systems (OpenGL® ES) to produce multiple views of a scene. In principle, multiview could be used to handle foveated rendering where four views are used, namely a higher resolution left eye view, a higher resolution right eye view, a lower resolution left eye view and a lower resolution right eye view. For example, multiview can be used to render four views simultaneously; an inner and outer view for each eye.

However, all views in current versions of multiview have to have the same resolution as each other. This may be acceptable when a single value can be found for both the inner and outer regions, for example for non-gazed-tracked implementations. However, current versions of multiview do not permit the use of a tightly focused foveated region for use in gaze-tracked implementations.

Further, current versions of multiview only allow up to four views. It may be possible to extend the number of views that can be used with a new multiview extension but it is likely that the additional views would also be subject to the single-resolution rule.

Moreover, the configuration of each view, including configuration associated with focus positions, is provided by an application at the start of the graphics pipeline. The configuration will therefore have a latency at least as long as the graphics pipeline. In the example described above, the latency, between tracking the eye location of the viewer and having associated graphics output, will therefore always be at least 50 ms. With such latency in mind, the graphics pipeline may take a conservative approach in determining the size of the high resolution region of the output. For example, the graphics pipeline may use a relatively large region, centered on the focus position of the viewer at the start of the graphics pipeline, in the expectation that the viewer is likely to be looking somewhere in that relatively large region when rendering is complete and thus is likely to be looking at the high resolution part of the output. However, such a conservative approach involves rendering a relatively large part of the scene at the higher resolution because of the uncertainty around where the viewer will be looking when the output is displayed.

It would be desirable to provide measures that are compatible with multiview, but which extend multiview to allow rendering to a fovea region that can change with low latency and/or to allow the fovea region to differ in resolution to the multiview resolution.

Examples will now be described in which a graphics processor is used to perform foveated rendering, by rendering plural images that represent the same view of a scene, but at different resolutions. The different resolution views are then combined to provide an output foveated image in which the resolution varies across the image. In these examples, the above-mentioned pipeline latency and the overhead of rendering at different resolutions may also be reduced.

In these examples, eye-tracking data is consumed after the start of the graphics pipeline, for example in the middle of the graphics pipeline. As such, more current (i.e. more recently received or obtained) eye-tracking data can be used, compared to eye-tracking data that is used at the start of the graphics pipeline. By reducing the latency of consuming eye-tracking data in the rendering pipeline, the benefits of foveated rendering may be increased. Furthermore, implementing such measures in the manner described herein may readily integrate with existing architectures, resulting in a particularly efficient implementation.

Figure 5:
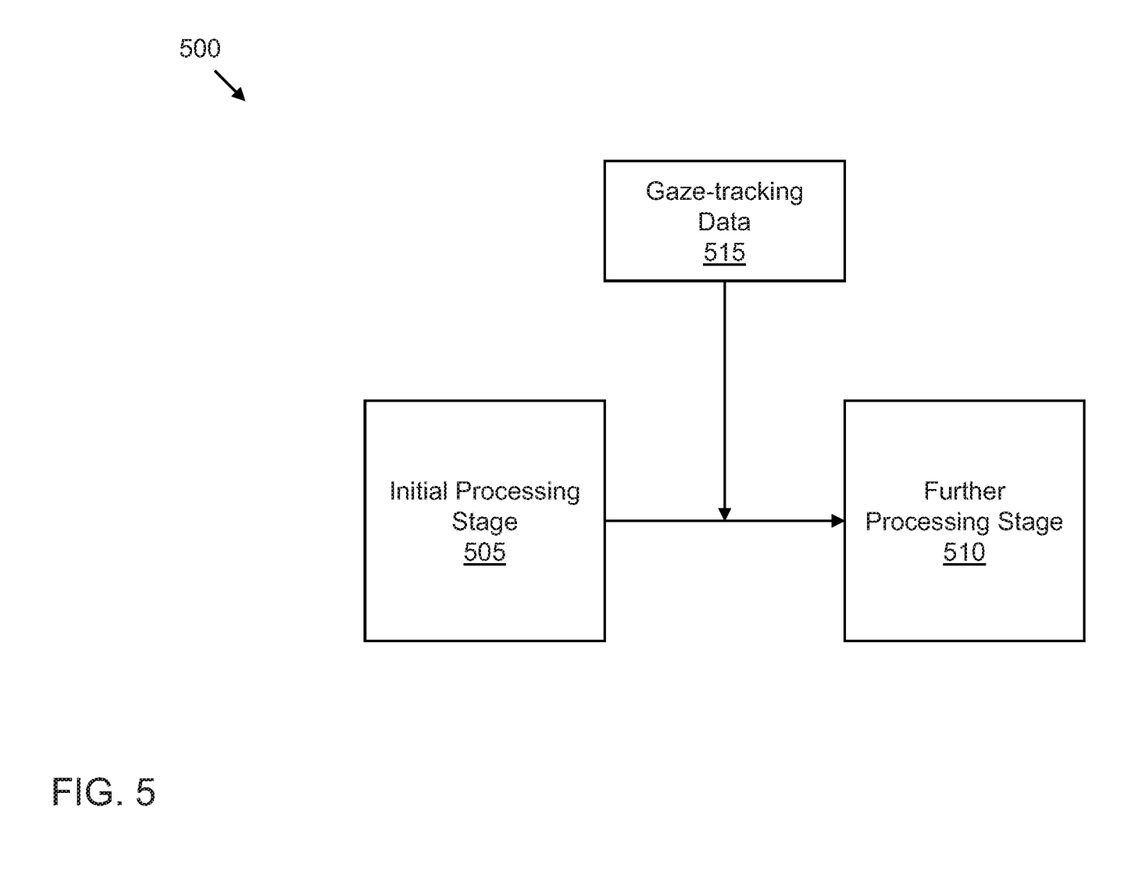
FIG. 5 shows schematically another example of a graphics processing pipeline in accordance with an embodiment of the present disclosure.

Referring to FIG. 5, there is shown schematically an example of a graphics processing pipeline 500.

The graphics processing pipeline 500 is comprised in a graphics processing system. The graphics processing pipeline 500 comprises, at least, an initial processing stage 505 and a further processing stage 510. Processing for the further processing stage 510 may have a higher computational burden than processing for the initial processing stage 505.

In some examples, the further processing stage 510 comprises one or more pixel-processing operations, for example rasterization and/or fragment shading, and the initial processing stage 505 comprises one or more geometry operations, for example vertex shading. In some examples, the further processing stage 510 comprises one or more pixel-processing operations, for example, rasterization and/or fragment shading, and the initial processing stage 505 comprises one or more data buffering operations, for example CPU buffering. In some examples, the further processing stage 510 comprises one or more geometry operations, for example fragment shading, and the initial processing stage 505 comprises one or more data buffering operations, for example CPU buffering.

Data for a scene at a first resolution and data for the scene at a second resolution are processed in the initial processing stage 505. After processing the data for the scene at the first and second resolutions in the initial processing stage 505, gaze-tracking data 515 relating to a current positioning of at least one eye of the user of a virtual reality user device is received. At least one sub-region of the scene is identified from the received gaze-tracking data 515.

The received gaze-tracking data 515 may relate to a current fixation point of the fovea of at least one eye of a user of a virtual reality user device. The identified at least one sub-region of the scene may relate to a sub-region centered around the current fixation point of the fovea of the at least one eye of the user of the virtual reality user device.

Data for the scene at the first resolution is processed in the further processing stage 510. However, only data corresponding to the identified at least one sub-region of the scene at the second resolution is processed in the further processing stage 510.

Processing of data for the scene in each stage of the graphics processing pipeline 500 may comprise processing a frame of data for the scene in each stage of the graphics processing pipeline 500.

The data for the scene may comprise data associated with a left eye view and data associated with a right eye view. Processing of the data for each stage of the graphics processing pipeline may comprise processing data associated with the left eye view and processing data associated with the right eye view. The received gaze-tracking data 515 may relate to a current positioning of the fovea of the left eye of the user of the virtual reality user device and a current positioning of the fovea of the right eye of the user of the virtual reality user device.

The identified at least one sub-region of the scene may relate to a left eye sub-region centered around the current positioning of the fovea of the left eye of the user of the virtual reality user device and a right eye sub-region centered around the current positioning of the fovea of the right eye of the user of the virtual reality user device.

The scene is rendered by combining the data for the scene processed in the further processing stage 510 at the first resolution and the data corresponding to the identified at least one sub-region of the scene processed in the further processing stage 510 at the second resolution.

Rendering the scene may comprise combining, firstly, left eye data for the scene processed in the further processing stage 510 at the first resolution and data corresponding to the identified left eye sub-region of the scene processed in the further processing stage 510 at the second resolution together with, secondly, right eye data for the scene processed in the further processing stage 510 at the first resolution and data corresponding to the identified right eye sub-region of the scene processed in the further processing stage 510 at the second resolution. At least a part of the identified left eye sub-region may be different from at least a part of the identified right eye sub-region.

In some examples, data for the scene at a third resolution is processed in the initial processing stage 505. The gaze-tracking data 520 is received after processing data for the scene at the third resolution in the initial processing stage 505 and relates to a current positioning of at least one eye of the user of the virtual reality user device after processing data for the scene at the third resolution in the initial processing stage 505. Data for the scene at the third resolution is processed in the further processing stage 510. However, only data corresponding to a further sub-region of the scene at the third resolution is processed in the further processing stage 510. Rendering the scene comprises further combining the data for the scene processed in the further processing stage 510 at the third resolution. The further sub-region of the scene may be identified from the received gaze-tracking data 515. The further sub-region of the scene may be calculated on the basis of the identified at least one sub-region of the scene.

Figure 6:
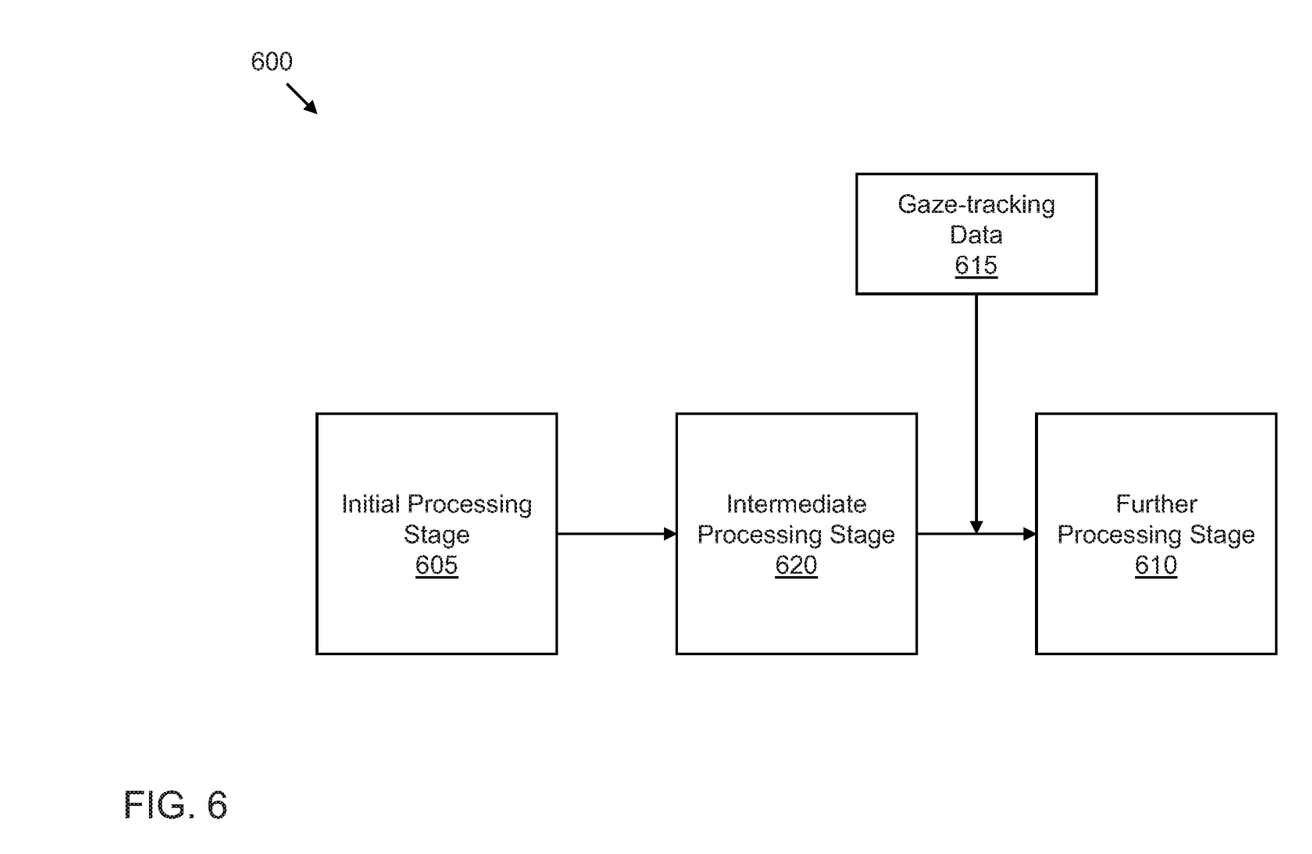
FIG. 6 shows schematically another example of a graphics processing pipeline in accordance with an embodiment of the present disclosure.

Referring to FIG. 6, there is shown schematically an example of a graphics processing pipeline 600. The graphics processing pipeline 600 is comprised in a graphics processing system. The graphics processing pipeline 600 comprises an initial processing stage 605 and a further processing stage 610.

The graphics processing pipeline 600 is similar to the graphics processing pipeline 500 described above in that it comprises an initial processing stage 605 and a further processing stage 610.

However, in this example, the graphics processing pipeline 600 also comprises an intermediate processing stage 620 in-between the initial processing stage 605 and the further processing stage 610.

Processing for the further processing stage 610 may have a higher computational burden than processing for the intermediate processing stage 620. For example, the further processing stage 610 may comprise one or more pixel processing operations, for example rasterization and/or fragment shading, and the intermediate processing stage 620 may comprise one or more geometry operations, for example vertex shading.

Data for the scene at the first resolution and data for the scene at the second resolution are processed in the intermediate processing stage 620. In this example, gaze-tracking data 615 is received after processing data for the scene at the first and second resolutions in the intermediate processing stage 620. In this example the gaze-tracking data 615 relates to a current positioning of at least one eye of a user of the virtual reality user device after processing data for the scene at the first and second resolutions in the intermediate processing stage 620. The gaze-tracking data 615 is received relatively late in the graphics processing pipeline 600 and so is more likely to accurately reflect the current focus point or points of the viewer. However, since it is received relatively late in the graphics processing pipeline 600 it has less of an influence on the overall processing conducted in the graphics processing pipeline 600.

Figure 7:
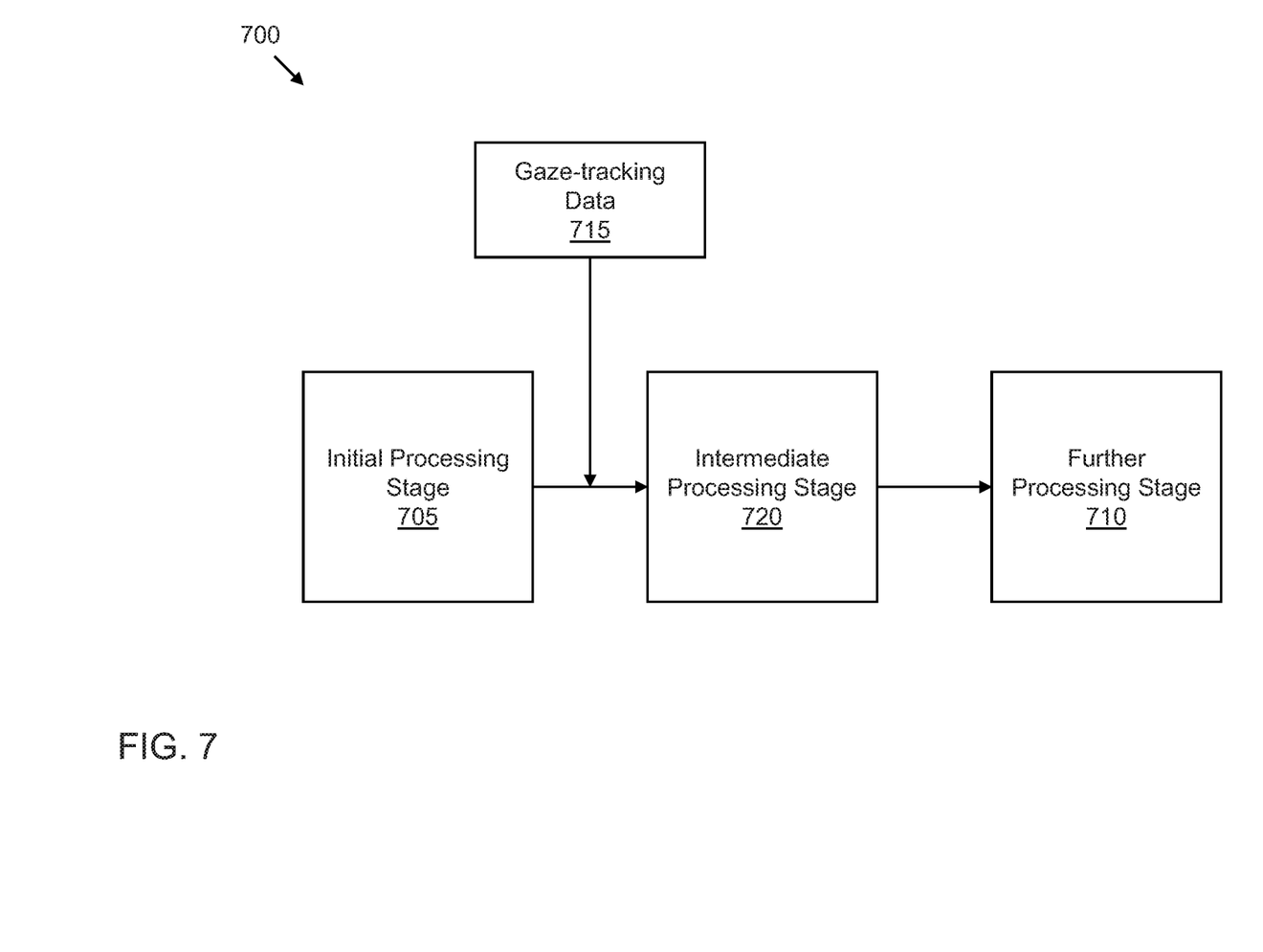
FIG. 7 shows schematically another example of a graphics processing pipeline in accordance with an embodiment of the present disclosure.

Referring to FIG. 7, there is shown schematically an example of a graphics processing pipeline 700. The graphics processing pipeline 700 is comprised in a graphics processing system. The graphics processing pipeline 700 comprises an initial processing stage 705, an intermediate processing stage 720 and a further processing stage 710.

The graphics processing pipeline 700 is similar to the graphics processing pipeline 600 described above with reference to FIG. 6 in that it comprises an initial processing stage 705, an intermediate processing stage 720 and a further processing stage 710.

However, whereas, in the graphics processing pipeline 600, gaze-tracking data 615 is received after processing data for the scene at the first and second resolutions in the intermediate processing stage 620, in the graphics processing pipeline 700, gaze-tracking data 715 is received before processing data for the scene at the first and second resolutions in the intermediate processing stage 720. Furthermore, in this example, the gaze-tracking data 715 relates to a current position of at least one eye of a user of the virtual reality user device before processing data for the scene at the first and second resolutions in the intermediate processing stage 720. As such, in this example, data for the scene at the first resolution is processed in the intermediate processing stage 720. However, only data corresponding to the identified at least one sub-region of the scene at the second resolution is processed in the intermediate processing stage 720. In addition, as described above, data for the scene at the first resolution and only data corresponding to the identified at least one sub-region of the scene at the second resolution are processed in the further processing stage 710. The gaze-tracking data 715 is still received after the very start of the graphics processing pipeline 700, but not as late in the graphics processing pipeline 700 as the gaze-tracking data 615 described above. The gaze-tracking data 715 is therefore less likely to accurately reflect the current focus point or points of the viewer compared to the gaze-tracking data 615. However, because the gaze-tracking data 715 is received earlier in the graphics processing pipeline 700 than the gaze-tracking data 615, it can have more of an influence on the overall processing conducted in the graphics processing pipeline 700.

Figure 8:
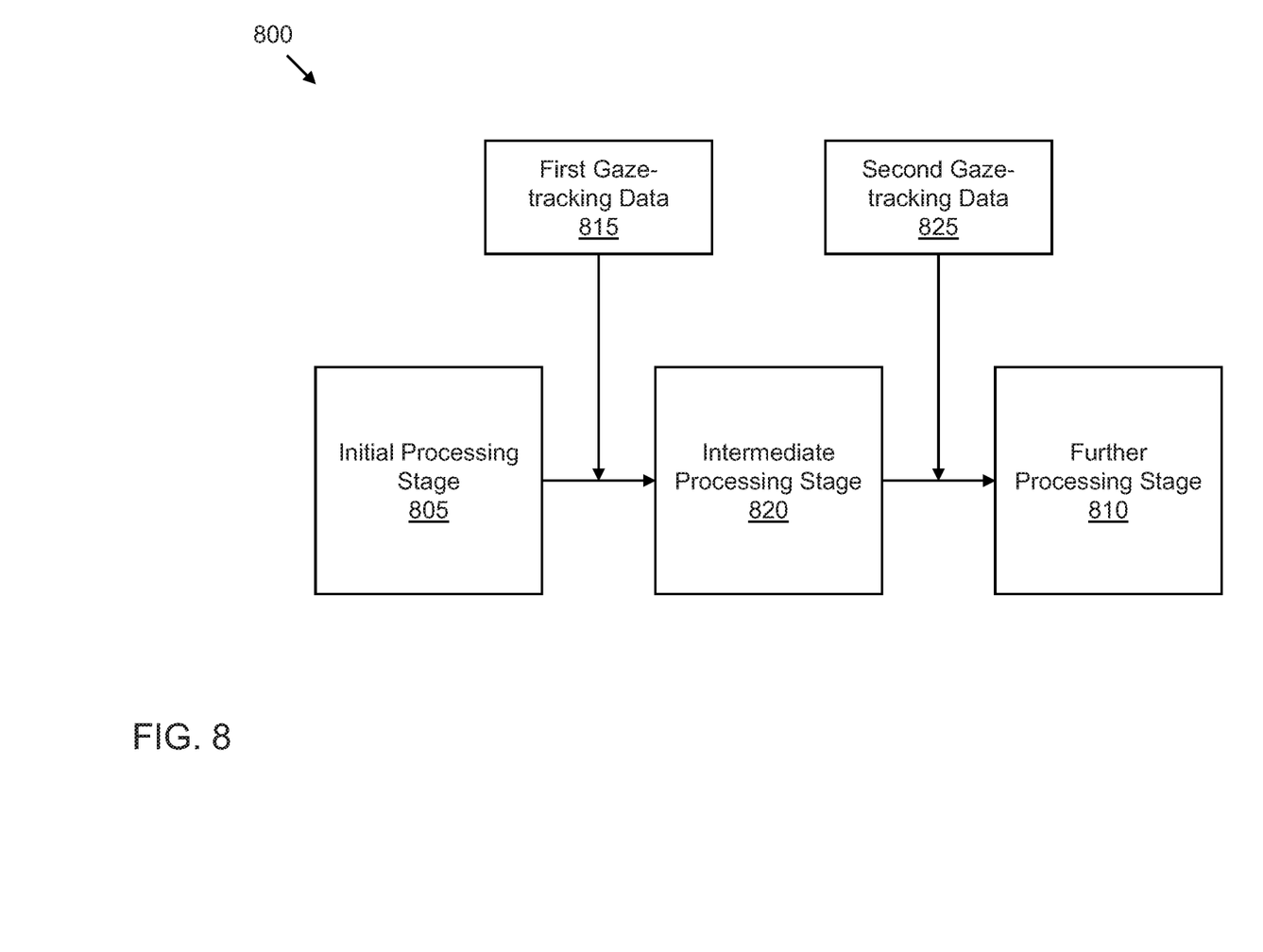
FIG. 8 shows schematically another example of a graphics processing pipeline.

Referring to FIG. 8, there is shown schematically an example of a graphics processing pipeline 800. The graphics processing pipeline 800 is comprised in a graphics processing system. The graphics processing pipeline 800 comprises an initial processing stage 805, an intermediate processing stage 820 and a further processing stage 810.

The graphics processing pipeline 800 is similar to the graphics processing pipelines 600, 700 described above with reference to FIGS. 6 and 7 in that it comprises an initial processing stage 805, an intermediate processing stage 820 and a further processing stage 810.

In this example, first gaze-tracking data 815 is received before processing data for the scene at the first and second resolutions in the intermediate processing stage 820. At least one first sub-region of the scene is identified from the first gaze-tracking data 815. In this example, the gaze-tracking data 815 relates to a current position of at least one eye of a user of the virtual reality user device before processing data for the scene at the first and second resolutions in the intermediate processing stage 820. As such, in this example, data for the scene at the first resolution is processed in the intermediate processing stage 820. However, only data corresponding to the identified at least one first sub-region of the scene at the second resolution is processed in the intermediate processing stage 820.

In this example, second gaze-tracking data 825 is received after processing data for the scene at the first and second resolutions in the intermediate processing stage 820. At least one second sub-region of the scene is identified from the second gaze-tracking data 825. In this example the second gaze-tracking data 825 relates to a current positioning of at least one eye of a user of the virtual reality user device after processing data for the scene at the first and second resolutions in the intermediate processing stage 820.

The at least one second sub-region of the scene may be contained in the at least one first sub-region of the scene. For example, the first gaze-tracking data 815 may be used to constrain processing to one or more first parts of the scene where, based on the first gaze-tracking data 815, the viewer is likely to be looking. This saves processing all of the scene at the second resolution in the intermediate processing stage 820. The second gaze-tracking data 825 may be used to constrain further processing to one or more second parts of the scene where, based on the second gaze-tracking data

825, the viewer is likely to be looking, and where the one or more second parts of the scene are smaller than the one or more first parts of the scene. The second gaze-tracking data 825 is more likely to indicate the part of the scene the user will be viewing when the scene is output.

The system may be configured to render to two or more sets of views simultaneously. This may facilitate efficient rendering to mixed resolutions and allow late-latched eye-tracking data. Late-latched eye-tracking data relates to consumption of eye-tracking data after an initial stage of the graphics pipeline. In examples described herein, late-latching of eye-tracking data is performed, after the graphics pipeline has been submitted.

An example technique for rendering to multiple resolutions, firstly without eye-tracking, will now be described. As described above, multiview enables rendering to a single set of views of the same resolution. This is described the OpenGL® ES API as binding a contiguous range from a GL_TEXTURE_2D_ARRAY to the GL_DRAW_FRAMEBUFFER target at one or more attachment points, such as color, depth and stencil. The GL_DRAW_FRAMEBUFFER target is also referred to herein as the draw target.

For example, rendering with depth testing to two views may involve an application creating a depth texture GL_TEXTURE_2D_ARRAY of width×height×num_views, creating a color texture GL_TEXTURE_2D_ARRAY of width×height×num_views, creating a framebuffer object, binding the depth range to the depth attachment of the framebuffer draw target, binding the color range to the color attachment of the framebuffer draw target and then drawing geometry with a shader that is configured to output for num_views, where, in this example, num_views=2.

This may be extended by introducing a new framebuffer target, labelled GL_DRAW_ALT_FRAMEBUFFER and referred to hereinafter as draw_alt. This new target type acts to duplicate the results of anything drawn to the draw target at a different, but related, resolution. The draw_alt framebuffers in effect mirror the draw framebuffers. The binding process may be the same as that indicated above, but for simplicity the draw_alt textures may match the original draw configuration. For example, if two views with depth and color at resolution X were bound to the draw target, there would be two views with depth and color at a related resolution Y(X) bound to draw_alt. In some examples, more than one 'draw_alt' target is used. In some such examples, each 'draw_alt' target has different related resolutions. In this case an array of targets may be used.

Each of the draw targets may be allowed to have completely different resolutions. Alternatively, the targets could have related resolutions, for example, in a manner that allows a power-of-two scaling. This would allow the geometry processed through the vertex and tiling stages to be reused between the two sets as will now be described. As such, the first and second resolutions referred to above may have a predetermined relationship, for example comprising a power of 2, such as ¼. Both sets may still however be fragment-shaded.

The GPU may be controlled to render plural different resolution versions of the same view of a scene when performing foveated rendering. The GPU may, for example, render three different resolution versions of the same view of the scene, namely a highest resolution view, a middle resolution view and a lowest resolution view. Those different resolution images of the view are then appropriately combined (or 'composited') to provide the output foveated image for example for display. Each of the different resolution images may show different fields of view (or 'parts') of the overall scene being rendered. In an example, a region of a foveated image associated with the fixation point has a highest resolution and one or more regions of the image away from the fixation point are displayed with a lower resolution.

An application requesting rendering may indicate to a driver for the graphics processor that the geometry for a scene is to be rendered to multiple views together with a scale factor associated with the foveal views. In response to such commands from the application, the driver then configures appropriate tiling and rendering tasks that it sends to the GPU to perform foveated rendering in the manner described herein.

In an example, the geometry for the scene is processed and tiled, in other words sorted into lists for respective rendering tiles of the images being rendered only once. This provides a single set of tile geometry lists that are then used in common (or are 'shared') when rendering each respective resolution image, namely when performing the fragment processing for rendering each respective resolution image. In particular, the GPU may be controlled to perform both the vertex position processing and the geometry list generation process only once for the scene that is being rendered, at the highest resolution that is required for an output image. Once the geometry lists have been prepared in this way, that single set of geometry lists may then be used when rendering each respective different resolution image showing some or all of the view.

For the highest resolution view, the prepared geometry lists can be used as they are to identify the geometry to be processed for each rendering tile when rendering that highest resolution image. For the other, lower resolution images, the geometry lists and the geometry in those lists that have been prepared at the highest resolution are used to identify and define geometry to be rendered for the lower resolution images by scaling down the geometry in the full resolution geometry list by an appropriate scaling factor. The scaling factor relates the resolution of the lower resolution image in question to the highest resolution for which the geometry lists have been prepared, for example using linear scaling. This downscaling may be done as part of the vertex position loading operation, but other arrangements would be possible, if desired.

In some examples, only some but not all of the final image is rendered at the different respective resolutions. In particular, regions of the images which will be unused in the final composition may not be rendered. Rendering of only selected portions of each different resolution image may be achieved by indicating for each rendering tile of the output image, which resolution image or images should be produced for that tile location. This information may be provided together with the geometry lists for the rendering tiles. Other arrangements, such as the driver for the GPU being configured to provide an appropriate list of tiles to be rendered when providing the rendering task to the graphics processor, and/or indicating a render exclude region that identifies an area within which tiles should not be rendered for an image could be used instead.

Once the appropriate parts of each different resolution image have been rendered by the GPU, those images are stored in appropriate frame buffers in memory of the graphics processing system. Those images are then appropriately combined to provide the final, output, foveated view that will be displayed.

The composition of the different resolution images of the view to provide the final, foveated output view may be performed by the GPU treating each different resolution view as a graphics texture and then using a texture mapping operation, which may be implemented as part of a fragment shader, to appropriately sample and combine the different resolution images across the final, output foveated view to be displayed.

When performing such foveated rendering, the highest resolution image is not necessarily in the center of the final output image that is displayed, but could be offset anywhere in the view, depending upon the position of the fixation point or points which may for example be determined through the use of gaze tracking sensors to identify where the viewer is actually looking.

Rendering the highest resolution set and downsampling to produce the other sets would not produce the same results.

The multisampled shading rate may be varied between the sets. In multiview, much like the resolution should preferably match between all the textures bound to a target, so should the multisample count preferably match. The resolution, multisample count, texture format and layout could however, be varied between the different sets. Anything that describes a texture that could be rendered to could be varied.

As indicated above, examples described herein relate foveated rendering using late-latched eye-tracking data.

In some examples, hardware fragment job, or work item, descriptors include a 2D axis-aligned bounding box that limits fragment shading to just within the region bounded by the bounding box. This is an efficient mechanism for limiting shading of a full resolution view to just a fovea region, the fovea region being associated with the bounding box. Bounding box data is used just before fragment shading commences, and so can change late in the graphics pipeline. This means there is, at worst, one frame of latency, namely 16.7 ms at 60 Hz, in relation to the currency of the gaze-tracking data being used. This is in contrast to 50 ms for the full graphics pipeline. The latency may be reduced further if geometry is submitted, tiled and shaded within a single frame.

Any 'late' bounding box data copied into previously submitted hardware fragment job descriptors may be needed in order to read it correctly. Given new data, this could be done either by the driver, if it knows the fragment jobs have not been started yet, or by a GPU compute shader, copying the data from a shared buffer.

Providing data late in the pipeline is not common in OpenGL® ES, but manually synchronized access to data is well understood. Compute shaders in OpenGL® ES are unsynchronized by default. A user uses synchronization primitives to achieve correct operation. This would provide sufficient infrastructure to update fragment descriptors just in time. An implementation could leverage atomics and shared buffers or expose equivalent functionality via a custom API entry point.

Vulkan is more low-level than OpenGL® ES and also does not perform any synchronization unless explicitly requested, so similar mechanisms to those in OpenGL® ES work in Vulkan. One feature of Vulkan is that its VkRenderPass object already has an explicit 'renderArea' property defining a 2D axis-aligned bounding box which limits shading to the specified region. Developing a Vulkan extension may be more efficient than developing an OpenGL® ES extension as the bounding box concept already exists in the Vulkan API. Vulkan may introduce an extension of the vkRenderPass object that would allow the user to define a second set of targets that 'mirror' others. This could allow for the equivalent of the 'GL_DRAW_ALT_FRAMEBUFFER' functionality described above.

In a specific example, and assuming multiview with two views, an implementation creates a set of texture arrays (color, depth, etc.) for two views at full resolution and binds those arrays to the 'draw' target in the framebuffer. The fragment bounding box for those texture arrays is updated to match the most recently reported eye-tracking data. The system creates a matching set of texture arrays created for another two views, but at a quarter of the resolution of the full resolution views, and binds those views to 'draw_alt' target. The scene is then drawn by consuming the draw and draw_alt targets. As such, in this example, the predetermined relationship between the first and second resolutions is ¼.

Then either at the start of each frame, or at regular intervals, all relevant submitted and still modifiable fragment jobs would be updated to use the latest bounding box. The ideal time for this would be after new-eye tracking data has been received, which could be running asynchronously to the main rendering loop.

This specific example would produce a quarter resolution output for all of the stereo image plus a pair of small but full resolution regions to match the eye location. These would then be overlaid to generate the final image. This overlaying process would be suitable for inclusion in a subsequent lens correction or compositing process such as those that exist in low-latency VR systems and are known as "timewarp", "asynchronous timewarp", "electronic display synchronization" amongst other terminology. It uses knowledge of the location and size of the regions, by tracking the same. A timewarp process could also blend between the two regions in order to create a softer transition, or choose to trim the full resolution to a smaller alternative shape, for example trimming the box to a sphere.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments of the disclosure.

What is claimed is:

1. A method of operating a graphics processing system, the system comprising a graphics processing pipeline comprising at least an initial processing stage and a further processing stage, the method comprising:
    processing, in the initial processing stage, data for a scene at a first resolution;
    processing, in the initial processing stage, data for the scene at a second resolution, wherein the initial processing stage comprises one or more geometry operations;
    after processing data for the scene at the first and second resolutions in the initial processing stage, receiving gaze-tracking data relating to a current positioning of at least one eye of a user of a virtual reality user device;
    identifying, from the received gaze-tracking data, at least one sub-region of the scene;
    processing, in the further processing stage, data for the scene at the first resolution;
    processing, in the further processing stage, only data corresponding to the identified at least one sub-region of the scene at the second resolution, wherein the further processing stage comprises one or more pixel-processing operations; and rendering the scene by combining the data for the scene processed in the further processing stage at the first resolution, and the data corresponding to the identified at least one sub-region of the scene processed in the further processing stage at the second resolution.

2. A method according to claim 1, wherein the graphics processing pipeline comprises an intermediate processing stage in-between the initial processing stage and the further processing stage, the method comprising:
processing, in the intermediate processing stage, data for the scene at the first resolution; and
processing, in the intermediate processing stage, only data corresponding to the identified at least one sub-region of the scene at the second resolution,
wherein the gaze-tracking data is received before processing data for the scene at the first and second resolutions in the intermediate processing stage and relates to a current position of at least one eye of a user of the virtual reality user device before processing data for the scene at the first and second resolutions in the intermediate processing stage.

3. A method according to claim 2, wherein processing for the further processing stage has a higher computational burden than processing for the intermediate processing stage.

4. A method according to claim 2, wherein processing for the further processing stage has a higher computational burden than processing for the initial processing stage.

5. A method according to claim 1, wherein the graphics processing pipeline comprises an intermediate processing stage in-between the initial processing stage and the further processing stage, the method comprising:
processing, in the intermediate processing stage, data for the scene at the first resolution; and
processing, in the intermediate processing stage, data for the scene at the second resolution,
wherein the gaze-tracking data is received after processing data for the scene at the first and second resolutions in the intermediate processing stage and relates to a current positioning of at least one eye of a user of the virtual reality user device after processing data for the scene at the first and second resolutions in the intermediate processing stage.

6. A method according to claim 5, wherein processing for the further processing stage has a higher computational burden than processing for the intermediate processing stage.

7. A method according to claim 5, wherein processing for the further processing stage has a higher computational burden than processing for the initial processing stage.

8. A method according to claim 1, wherein the initial processing stage comprises one or more data buffering operations.

9. A method according to claim 1, wherein processing of data for a scene in each stage of the graphics processing pipeline comprises processing a frame of data for the scene in each stage of the graphics processing pipeline.

10. A method according to claim 1, wherein the first resolution is relatively high compared to the second resolution.

11. A method according to claim 1, wherein the first and second resolution have a predetermined relationship.

12. A method according to claim 1, wherein the received gaze-tracking data relates to a current fixation point of the fovea of at least one eye of a user of the virtual reality user device, and
wherein the identified at least one sub-region of the scene relates to a sub-region centred around the current fixation point of the fovea of the at least one eye of a user of the virtual reality user device.

13. A method according to claim 1, wherein data for the scene comprises data associated with a left eye view and data associated with a right eye view and processing of the data for each stage of the graphics processing pipeline comprises processing data associated with the left eye view and processing data associated with the right eye view, and
wherein the received gaze-tracking data relates to a current positioning of the fovea of a left eye of a user of the virtual reality user device and a current positioning of the fovea of a right eye of a user of the virtual reality user device.

14. A method according to claim 13, wherein the identified at least one sub-region of the scene relates to a left eye sub-region centred around the current positioning of the fovea of the left eye of the user of the virtual reality user device and a right eye sub-region centred around the current positioning of the fovea of the right eye of the user of the virtual reality user device, and
wherein rendering the scene comprises:
combining left eye data for the scene processed in the further processing stage at the first resolution, and data corresponding to the identified left eye sub-region of the scene processed in the further processing stage at the second resolution; and
combining right eye data for the scene processed in the further processing stage at the first resolution, and data corresponding to the identified right eye sub-region of the scene processed in the further processing stage at the second resolution.

15. A method according to claim 14, wherein at least a part of the identified left eye sub-region is different from at least a part of the identified right eye sub-region.

16. A method according to claim 1, comprising:
processing, in the initial processing stage, data for the scene at a third resolution,
wherein the gaze-tracking data is received after processing data for the scene at the third resolution in the initial processing stage and relates to a current positioning of at least one eye of a user of the virtual reality user device after processing data for the scene at the third resolution in the initial processing stage, the method comprising:
processing, in the further processing stage, data for the scene at the third resolution; and
processing, in the further processing stage, only data corresponding to a further sub-region of the scene at the third resolution,
wherein rendering the scene comprises further combining the data for the scene processed in the further processing stage at the third resolution.

17. A method according to claim 16, comprising identifying the further sub-region of the scene from the received gaze-tracking data.

18. A method according to claim 16, comprising calculating the further sub-region of the scene on the basis of the identified at least one sub-region of the scene.

19. A non-transitory computer-readable storage medium comprising computer-executable instructions which, when executed by a processor, cause a method of operating a graphics processing system to be performed, the graphics processing system comprising a graphics processing pipeline comprising at least an initial processing stage and a further processing stage, the method comprising:

processing, in the initial processing stage, data for a scene at a first resolution;

processing, in the initial processing stage, data for the scene at a second resolution, wherein the initial processing stage comprises one or more geometry operations;

after processing data for the scene at the first and second resolutions in the initial processing stage, receiving gaze-tracking data relating to a current positioning of at least one eye of a user of a virtual reality user device;

identifying, from the received gaze-tracking data, at least one sub-region of the scene;

processing, in the further processing stage, data for the scene at the first resolution;

processing, in the further processing stage, only data corresponding to the identified at least one sub-region of the scene at the second resolution, wherein the further processing stage comprises one or more pixel-processing operations; and rendering the scene by combining the data for the scene processed in the further processing stage at the first resolution, and the data corresponding to the identified at least one sub-region of the scene processed in the further processing stage at the second resolution.

20. A graphics processing system comprising a graphics processing pipeline, the graphics processing pipeline comprising at least an initial processing stage and a further processing stage, the graphics processing system being arranged to:

process, in the initial processing stage, data for a scene at a first resolution;

process, in the initial processing stage, data for the scene at a second resolution, wherein the initial processing stage comprises one or more geometry operations;

after processing data for the scene at the first and second resolutions in the initial processing stage, receive gaze-tracking data relating to a current positioning of at least one eye of a user of a virtual reality user device;

identify, from the received gaze-tracking data, at least one sub-region of the scene;

process, in the further processing stage, data for the scene at the first resolution;

process, in the further processing stage, only data corresponding to the identified at least one sub-region of the scene at the second resolution, wherein the further processing stage comprises one or more pixel-processing operations; and render the scene by combining the data for the scene processed in the further processing stage at the first resolution, and the data corresponding to the identified at least one sub-region of the scene processed in the further processing stage at the second resolution.

* * * * *